(12) United States Patent
Laine et al.

(10) Patent No.: US 6,656,588 B1
(45) Date of Patent: Dec. 2, 2003

(54) ULTRAFINE POWDERS AND THEIR USE AS LASING MEDIA

(75) Inventors: Richard M. Laine, Ann Arbor, MI (US); Stephen C. Rand, Ann Arbor, MI (US); Thomas Hinklin, Ann Arbor, MI (US); Guy R. Williams, Schaumberg, IL (US)

(73) Assignee: The Regents of the University of Michigan

( * ) Notice: Subject to any disclaimer, the term of this patent is extended or adjusted under 35 U.S.C. 154(b) by 0 days.

(21) Appl. No.: 09/857,151

(22) PCT Filed: Nov. 30, 1999

(86) PCT No.: PCT/US99/28270

§ 371 (c)(1),
(2), (4) Date: Jul. 30, 2001

(87) PCT Pub. No.: WO00/38282

PCT Pub. Date: Jun. 29, 2000

Related U.S. Application Data (60) Provisional application No. 60/110,479, filed on Dec. 1, 1998.

(51) Int. Cl.$^7$ .............................. C01F 1/00; C01F 17/00; B32B 5/16
(52) U.S. Cl. ..................... 428/402; 423/21.1; 423/23; 423/69; 423/84; 423/89; 423/99; 423/111; 423/115; 423/155; 423/179; 428/403; 428/323
(58) Field of Search ........................... 423/21.1, 23, 69, 423/84, 89, 99, 111, 115, 155, 179; 428/402, 403, 323

(56) References Cited

U.S. PATENT DOCUMENTS

| | | | | |
|---|---|---|---|---|
| 4,548,798 A | * | 10/1985 | Rice | 423/263 |
| 5,075,090 A | * | 12/1991 | Lewis et al. | 423/337 |
| 5,744,118 A | * | 4/1998 | Imamura et al. | 423/593 |
| 5,958,361 A | * | 9/1999 | Laine et al. | 423/592 |
| 6,139,816 A | * | 10/2000 | Liu et al. | 423/608 |
| 6,482,387 B1 | * | 11/2002 | Gulgun et al. | 423/593 |

OTHER PUBLICATIONS

G.A. Berger, M. Kempe, A.Z. Genack, *Dynamics of Stimulated Emission from Random Media*, Physical Review E, vol. 56, No. 5, 1997.

D. Wiersma and A. Lagendijk, "*Light Diffusion with Gain and Random Lasers*," Phys. Rev. E54, 4256–4265 (1996).

S. John and G. Pang, "*Theory of Lasing in a Multiple–Scattering Medium*," Phys. Rev. A54, 3642–2652 (1996).

P.W. Anderson, "*Absence of Diffusion in Certain Random Lattices,*" Phys. Rev. 109, 1492 (1958).

D.S. Wiersma, M.P. van Albada, B.A. van Tiggelen, and A. Lagendijk, "*Experimental Evidence for Recurrent Multiple Scattering Events of Light in Disordered Media*," Phys. Rev. Lett. 74, 4193–4196 (1995).

Sajeev John, *Electromagnetic Absorption of a Disordered Medium Near a Photon Mobility Edge*, Phys. Rev. Lett., vol. 53, No. 22, 1984.

(List continued on next page.)

*Primary Examiner*—H. Thi Le
(74) *Attorney, Agent, or Firm*—Brooks Kushman P.C.

(57) ABSTRACT

Doped, nanosize metal oxide particles have been shown to exhibit stimulated emission and continuous-wave laser action when energized appropriately, for example by electron beams. The doped particles are useful as solid state lasing devices and "laser paints". Particles containing homogeneously distributed dopant atoms in concentrations greater than the thermodynamic solubility in the metal oxide matrix, and having in some circumstances, unusual oxidation states, have been produced.

21 Claims, 8 Drawing Sheets

OTHER PUBLICATIONS

J.X. Zhu, D.J. Pine, D.A. Weitz, *Internal Reflection of Diffusive Light in Random Media*, Phys. Rev. Lett., vol. 44, No. 6, 1991.

A. Z. Genack, N. Garcia, *Observation of Photon Localization on a Three–Dimensional Disordered System*, Phys. Rev. Lett., vol. 66, No. 16, 1991.

M.P. Van Albada, A. Lagendijk, *Observation of Weak Localization of Light in a Random Medium*, Phys. Rev. Lett., vol. 55, No. 24, 1985.

B.M. Tissue, "*Synthesis and Luminescence of Lanthanide Ions in Nanoscale Insulating Hosts*," Chem Mater. 10, 2837–45 (1988).

C. Gouedard, D. Husson, C. Sauteret, F. Auzel, and A. Migus, "*Generation of Spatially Incoherent Short Pulses in Laser–Pumped Neodymium Stoichiometric Crystals and Powders*," J.O.S.A. B10, 2358–2363 (1993).

P.W. Anderson, "*The Question of Classical Localization: a Theory of White Paint?*," Philos. Mag. B52, 505 (1985).

M.A. Noginov, N.E. Noginov, H.J. Caufield, P. Venkateswarlu, T. Thompson, M. Mahdi, and V. Ostroumov, *Short–pulsed Stimulated Emission in the Powders of $NdAl_3(BO)$, and $Nd:Sr_5(PO_4)_3F$ Laser Crystals*, J.O.S.A. B13, 2024 (1996).

E. Leith, C. Chane, H. Chen, Y. Chen, D. Dilworth, J. Lopez, J. Rudd, P.–C. Sun, J. Valdmanis, and G. Vossler, *Imaging Through Scattering Media with Holography*, J.O.S.A. A9, 1148 (1992).

M. Siddique, R.R. Alfano, G.A. Berger, M. Kempe, A.Z. Genack, *Time–Resolved Studies of Stimulated Emission from Colloidal Dye Solutions*, Opt. Lett. 21, 450 (1996).

G. Gbur, E. Wolf, *Phase Conjugation with Random Fields and with Deterministic and Random Scatterers*, Opt. Lett., vol. 21, No. 1, 1999.

R.M. Balachandran, N.M. Lawandy, J.A. Moon, *Theory of Laser Action in Scattering Gain Media*, Opt. Lett., vol. 22, No. 5, 1997.

D.S. Wiersma, P. Bartolini, A. Lagendijk, R. Righini, *Localization of Light in a Disordered Medium*, Letters to Nature, vol. 390, 671, 1997.

E. Wolf, T. Shirai, G. Agarwal, L. Mandel, *Storage and Retrieval of Correlation Functions of Partially Coherent Fields*, Opt. Lett., vol. 24, No. 6, 1999.

V.S. Letokhov, "*Generation of Light by a Scattering Medium with Negative Resonance Absorption*," Sov. Phys. JETP 26, 835 (1968).

V.M. Markushev, V.F. Zolin, and Ch. M. Briskina, *Luminescence and Stimulated Emission of Neodymium in Sodium Lanthanum Molybdate Powders*, Sov. J. Qu. El. 16, 281 (1986).

R.W. Boyd and J.E. Sipe, *Nonlinear Optical Susceptibilities of Layered Composite Materials*, J.O.S.A. B11, 297 (1994).

C. Gouedard, D. Husson, C. Sauteret, F. Auzel, and A. Migus, *Generation of Spatially Incoherent Short Pulses in Laser–Pumped Neodymium Stoichiometric Crystals and Powders*, J.O.S.A. B10, 2358–2363 (1993).

M. Kaveh, M. Rosenbluh and I. Freund, *Speckle Patterns Permit Direct Observation of Phase Breaking*, Nature 326, 778 (1987).

N.M. Lawandy, R.M. Balachandran, A.S.L. Gomes and E. Sauvain, "*Laser Action in Strongly Scattering Media*," Nature 368, 436–438 (1994).

D. Wiersma and A. Lagendijk, "*Laser Action in Very White Paint*," Physics World, 33–37, Jan. 1997.

* cited by examiner

ULTRAFINE POWDERS AND THEIR USE AS LASING MEDIA

CROSS-REFERENCE TO RELATED APPLICATION

This application is the U.S. national phase of PCT application number PCT/US99/28270, filed Nov. 30, 1999, which further claims the benefit of U.S. provisional application serial No. 60/110,479, filed Dec. 1, 1998.

This invention was made in part with Government support under Grant No. F49620-98-1-0189 awarded by the Air Force Office of Scientific Research. The Government has certain rights in this invention.

TECHNICAL FIELD

The subject invention pertains to solid state powder lasers and nanophosphors, to processes for producing powders suitable for such use, and to the powders produced thereby.

BACKGROUND ART

Past attempts to utilize highly scattering solid materials as candidates for stimulated emission have required irradiation with high intensity energy sources, such as lasers, to demonstrate stimulated emission. "Laser paints", surfaces coated with solid particulates, have required such a high threshold level of optical energy input, because of the excessive attenuation (and therefore loss) that normally accompanies scattering, that their suitability for most practical purposes is highly questionable.

Although electron beams are known to cause emission in solid, dielectric phosphors, these materials are not known to support continuous-wave laser action. Atoms in the solid lattice that absorb the electron energy subsequently release it spontaneously and randomly. A large portion of the energy emitted is reabsorbed by the particulate, by its neighbors, or is highly scattered. Phosphors used in CRT tubes, for example, absorb electron beam energy and display spontaneous but not stimulated luminescence, scattering, etc.

Since the discovery of solid state lasers in the early 1960s, lasers have become progressively more commonplace in society, finding applications ranging from compact disc systems and supermarket scanners to precision surgical, optimetric and cutting instruments. The available types of lasers are very diversified, and now comprise solid, liquid, gas and plasma media pumped by light, electrons, chemical reactions, or other means. Generally, lasers require an external cavity to operate.

Luminescence in the multiple-scattering regime has been reported by several researchers from powders containing rare earth and transition metal ions, and extensively investigated theoretically. B. M. Tissue, "Synthesis and luminescence of lanthanide ions in nanoscale insulating hosts," Chem Mater. 10, 2837–45 (1988), and laser action, N. M. Lawandy, R. M. Balachandran, A. S. L. Gomes and E. Sauvain, "Laser action in strongly scattering media," Nature 368, 436–438 (1994); C. Gouedard, D. Husson, C. Sauteret, F. Auzel, and A. Migus, "Generation of spatially incoherent short pulses in laser-pumped neodymium stoichiometric crystals and powders," J.O.S.A. B10, 2358–2363 (1993); D. Wiersma and A. Lagendijk, "Light diffusion with gain and random lasers," Phys. Rev. E54, 4256–4265 (1996); V. S. Letokhov, "Generation of light by a scattering medium with negative resonance absorption," Sov. Phys. JETP 26, 835 (1968); S. John and G. Pang, "Theory of lasing in a multiple-scattering medium," Phys. Rev. A54, 3642–3652 (1996). Spectral narrowing and threshold behavior have been reported in the absence of external cavities, and measured transient behavior shown to be characteristic of inverted systems of impurity ions with optical feedback mediated entirely by scattering. Lossless powders in which gain is encountered despite very short scattering mean free path lengths are sometimes referred to as "laser paints." D. Wiersma and A. Lagendijk, "Laser action in very white paint," Physics World, 33–37, January 1997.

Laser paint media in which the mean transport length l* is actually less than the wavelength itself have interesting properties which may be useful for speckle-free lithography at sub-micron dimensions or applications in which bright, omni-directional output is desired for displays or light sources of arbitrary shape. However, highly-scattering powders are difficult to pump and study optically because the very scattering that provides the feedback for laser action causes pump light to be scattered backwards very efficiently as it enters the medium. Incident light does not penetrate the medium well and the overall efficiency of any pumping and lasing processes is destined to be low. This effect would be particularly true under conditions of "strong localization," when light propagation undergoes an Anderson transition, P. W. Anderson, "Absence of diffusion in certain random lattices," Phys. Rev. 109, 1492 (1958); P. W. Anderson, "The question of classical localization: a theory of white paint?," Philos. Mag. B52, 505 (1985), to a regime of recurrent scattering which results in completely localized electromagnetic "transport." D. S. Wiersma, M. P. van Albada, B. A. van Tiggelen, and A. Lagendijk "Experimental evidence for recurrent multiple scattering events of light in disordered media," Phys. Rev. Lett. 74, 4193–4196 (1995). In this regime, scattering would be so strong that the direction of light would be randomized before it has propagated a distance of even one wavelength.

Previous experiments, and theory, on localization of light and stimulated emission in scattering media, as well as interest in the consequences of recurrent scattering events have all heightened current interest in electromagnetic phenomena in multiple-scattering media. See, e.g., M. P. Van Albada and A. Lagendijk, Phys. Rev. Lett. 55, 2692 (1985); V. M. Markushev, V. F. Zolin, and Ch. M. Briskina, Sov. J. Qu. El. 16, 281 (1986); A. Z. Genack and N. Garcia, Phays. Rev. Lett. 66, 2064 (1991); J. X. Zhu, D. J. Pine, and D. A. Weitz, Phys. Rev. A44, 3948–3959 (1991); C. Gouedard, D. Husson, C. Sauteret, F. Auzel, and A. Migus, J.O.S.A. B10, 2358–2363 (1993); N. M. Lawandy, R. M. Balachandran, A. S. L. Gomes and E. Sauvain, Nature 368 436–438 (1994); M. Siddique, R. R. Alfano, G. A. Berger, M. Kempe, and A. Z. Genack, Opt. Lett. 21, 450 (1996); M. A. Noginov, N. E. Noginov, H. J. Caulfield, P. Venkateswarlu, T. Thompson, M. Mahdi, and V. Ostroumov, J.O.S.A. B13, 2024 (1996); D. Wiersma and A. Lagendijk, Physics World, 33–37, January 1997; S. John, Phys. Rev. Lett. 53 2169 (1984); P. W. Anderson, Phil. Mag. B52, 505 (1985); V. S. Letokhov, Sov. Phys. JETP 26, 835. (1968); S. John and G. Pang, Phys. Rev. A54, 3642–3652 (1996); R. M. Balachandran, N. M. Lawandy, and J. A. Moon, Opt. Lett. 22, 319 (1997); D. Wiersma and A. Lagendijk, Phys. Rev., E54, 4256–4265 (1996); G. A. Berger, M. Kempe, and A. Z. Genack, Rev. E56, 6118 (1997); D. S. Wiersma, M. P. van Albada, B. A. van Tiggelen, and A. Lagendijk, Phys. Rev. Lett. 74, 4193–4196 (1995); 18. D. S. Wiersma, P. Bartolini, A. Lagendijk and R. Rhigini, Nature 390, 671 (1997). Traditionally, multiple scattering has been of interest to researchers studying statistical aspects of weakly localized light coherence or imaging. See e.g., M. Kaveh, M. Rosenbluh and I. Freund, Nature 326, 778 (1987), G. Gbur and E. Wolf, Opt. Lett. 24, 10 (1999); E. Wolf, T. Shirai, G. Agarwal, L. Mandel, Opt. Lett. 24, 367 (1999); E. Leith, C. Chen, H. Chen, Y. Chen, D. Dilworth, J. Lopez, J. Rudd, P.-C. Sun, J. Valdmanis, and G. Vossler, J.O.S.A. A9, 1148 (1992). Others have demonstrated powder lasers in the diffusive propagation regime. See, V. M. Markushev, V. F. Zolin, and Ch. M. Briskina, Sov. J. Qu. El. 16, 281 (1986); C. Gouedard, D. Husson, C. Sauterei, F. Auzel, and A. Migus, J.O.S.A. B10, 2358–2363 (1993); M. A. Noginov, N. E. Noginov, H. J. Caulfield, P. Venkateswarlu, T. Thompson, M. Mahdi, and V. Ostroumov, J.O.S.A. B13, 2024 (1996). However, at the boundary between the diffusive and strong scattering regimes it is expected that significant changes will occur in the interaction of light with matter which are fundamentally new. Severe scattering is predicted to cause strong Anderson localization of light when absorption is negligible. Three-dimensional confinement of light within regions of sub-wavelength dimensions could have profound implications for the degree of coherence and back-scattered intensity of elastically-scattered light. The dielectric constant becomes difficult to define when propagation is restricted to sub-wavelength "transport" distances ($l^* < 1$) in random media, because fluctuations in the structure of the medium and non-uniformities in the field amplitude occur on the same distance scale. See, S. John, Phys. Rev. Lett. 53, 2169 (1984); 11. P. W. Anderson, Phil. Mac. B52, 505 (1985); R. W. Boyd and J. E. Sipe, J.O.S.A. B11, 297 (1994). Additionally, it has been suggested that the onset of recurrent (closed loop) scattering events in this regime will reduce the threshold for laser action mediated purely by scattering feedback. S. John and G. Pang, Phys. Rev. A54, 3642–3652 (1996); and G. A. Berger, M. Kempe, and A. Z. Genack, Rev. E56, 6118 (1997).

DISCLOSURE OF INVENTION

The present invention pertains to solid state lasers composed of metal oxide and mixed-metal oxide nanosize phosphor powders, which are preferably doped with one or more transition metals, lanthanide metals, or actinide metals. The present invention also pertains to objects composed of such nanosize particles, which are capable of lasing when stimulated by a suitable stimulation method, particularly by impingement of electrons, including a current or beam of electrons. The objects are preferably in the form of a thin film, or waveguide, and may be suitable for use as a light source, as a flat panel display component, or for other purposes where emission of light by stimulated emission would be useful.

The subject invention further pertains to a process for emitting electromagnetic radiation by stimulated emission, this process comprising assembling a plurality of doped metal oxide nanoparticles, and exposing the nanoparticles to a suitable excitation source, whereupon stimulated emission of electromagnetic radiation results. The source may be a particle beam or current of charged particles, a source of radiant energy such as a laser or flashlamp, or a chemical or explosive reaction. The excitation energy source preferably comprises energetic electrons:

The subject invention further pertains to a process for emitting white light by stimulating an assembly of doped nanoparticles which emit red, blue, and green or other combinations of primary colors which may be viewed as substantially "white" light. This emission may comprise the joint emissions of several differently-emitting dopant ions in nanoparticles, (mixed within each nanoparticle or residing in separate nanoparticles of a mixed powder), or may be the emission of a single ion species undergoing stimulated emission on more than one transition simultaneously.

The subject invention further pertains to the preparation of highly doped nanoparticles whose dopant concentration exceeds the thermodynamically stable concentration limit, by flame pyrolyzing a ceramic precursor solution containing a dopant concentration in excess of the thermodynamically stable dopant concentration in the solid ceramic.

BRIEF DESCRIPTION OF DRAWINGS

FIGS. 1(a–c) illustrates emission intensity and frequency distribution of emission by phosphors irradiated with electron beams in vacuo at various current levels (a) Pr: $\beta$-$Al_2O_3$; (b) Nd: $\delta$-$Al_2O_3$; (c) Ce: $\delta$-$Al_2O_3$.

FIGS. 2(a–d) illustrates threshold intensities at which the slope of emissive output abruptly increases as electron current is increased, indicating laser action. (a) Pr: $\beta$-$Al_{23}$ at 633 nm. (b) Nd: $\delta$-$Al_2O_3$ at 467 nm. (c) Ce: $\delta$-$Al_2O_3$ at 362 nm. (d) Nd: $\delta$-$Al_2O_3$ at 870 nm. The inset in (c) shows the reduction of emission linewidth in Ce: d-$Al_2O_3$ as current is increased, revealing the onset of modest gain narrowing.

FIGS. 3(a–c) illustrates coherent back-scattered intensity distributed versus angle near the exact back-scattering direction. The detector scanning plane was perpendicular to the incident polarization. (a) Pr: $\beta$-$Al_2O_3$. (b) Nd: $\delta$-$Al_2O_3$. (c) Ce: $\delta$-$Al_2O_3$.

BEST MODE FOR CARRYING OUT THE INVENTION

Applicants have discovered that nanosized, doped, metal oxide and mixed-metal oxide particles, particularly those having diameters of less than 150 nm, more particularly less than 50 nm, and most preferably in the range of 1 nm to 35 nm, can exhibit stimulated emission and continuous-wave laser action at ultraviolet, visible and infrared wavelengths at relatively low threshold energy levels. The wavelengths, bandwidths, and intensity can be varied by altering the concentration and nature of dopant atoms, the oxide matrix, particle size, and by including ions other than oxide ions in the substantially metal oxide particles.

The nanosized particles may be prepared by any method which allow the preparation of metal oxide particles in the cited size ranges, and with the required dopant content, but are preferably prepared by flame spray pyrolysis and similar techniques which produce distinct (non-aggregated) particles. Because of the rapid, high temperature pyrolysis, levels of dopants which are higher than typical of thermodynamically stable materials or which are thermodynamically unstable can be obtained; in other words, the dopant concentration is kinetically controlled. Moreover, and again due to the rapid, high temperature pyrolysis, particulates containing dopant metals having unusual oxidation states, and which thus exhibit electronic transitions which do not normally occur, may be obtained. Nanosize particles having dopant concentrations beyond the equilibrium amount have not been heretofore disclosed.

A further unusual aspect of the present nanosized particles is that the stimulated emission may be of a wavelength which is longer than the particle diameter. Emission of light in the UV, visible, and infrared portions of the spectrum has been demonstrated. Simultaneous emission of light in the red, blue, and green portions of the spectrum is commonly used to form white light of a desired Color Rendering Index (CRI) based on the CIE standard of 1931, and has also been demonstrated. Pr-, Tb-, and Nd (or Tm)-doped dielectric nanophosphors, for example, furnish the red, green, and blue components respectively for white light phosphors. In addition, one-component nano-powders such as Ce: YAG that are used commercially. in large particle size as white light phosphors are expected to exhibit stimulated emission of white light.

Figure 2A:
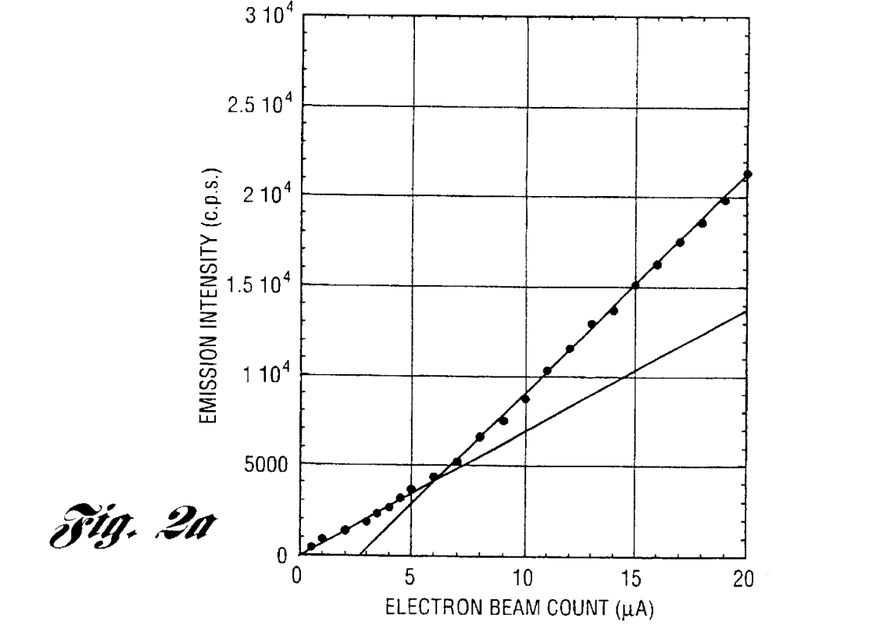
Figure 2B:
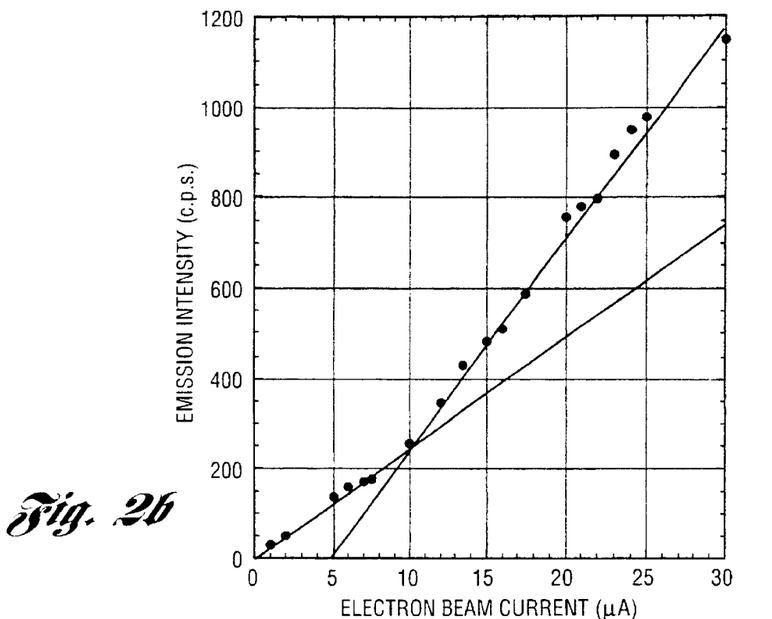
Figure 2C:
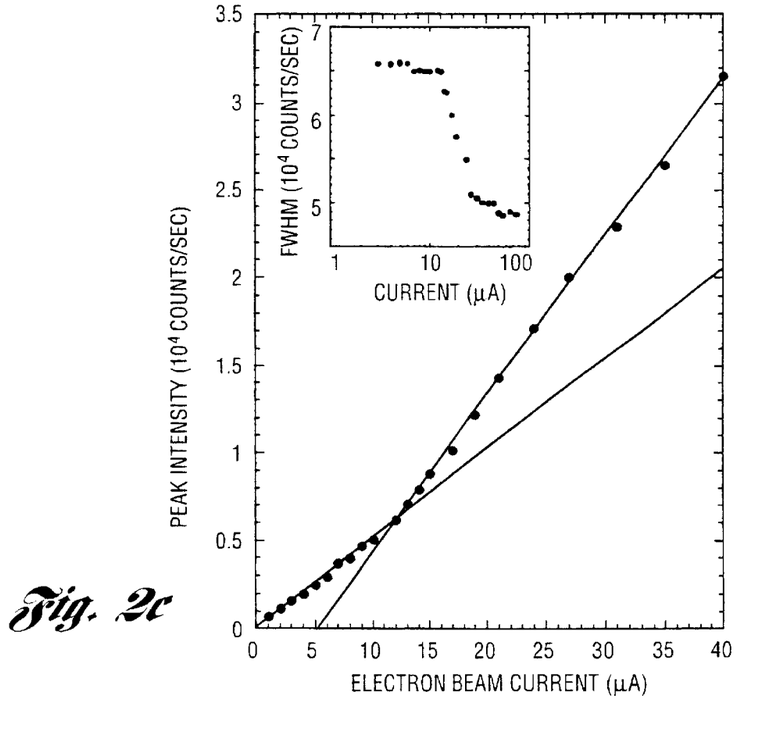
Figure 4:
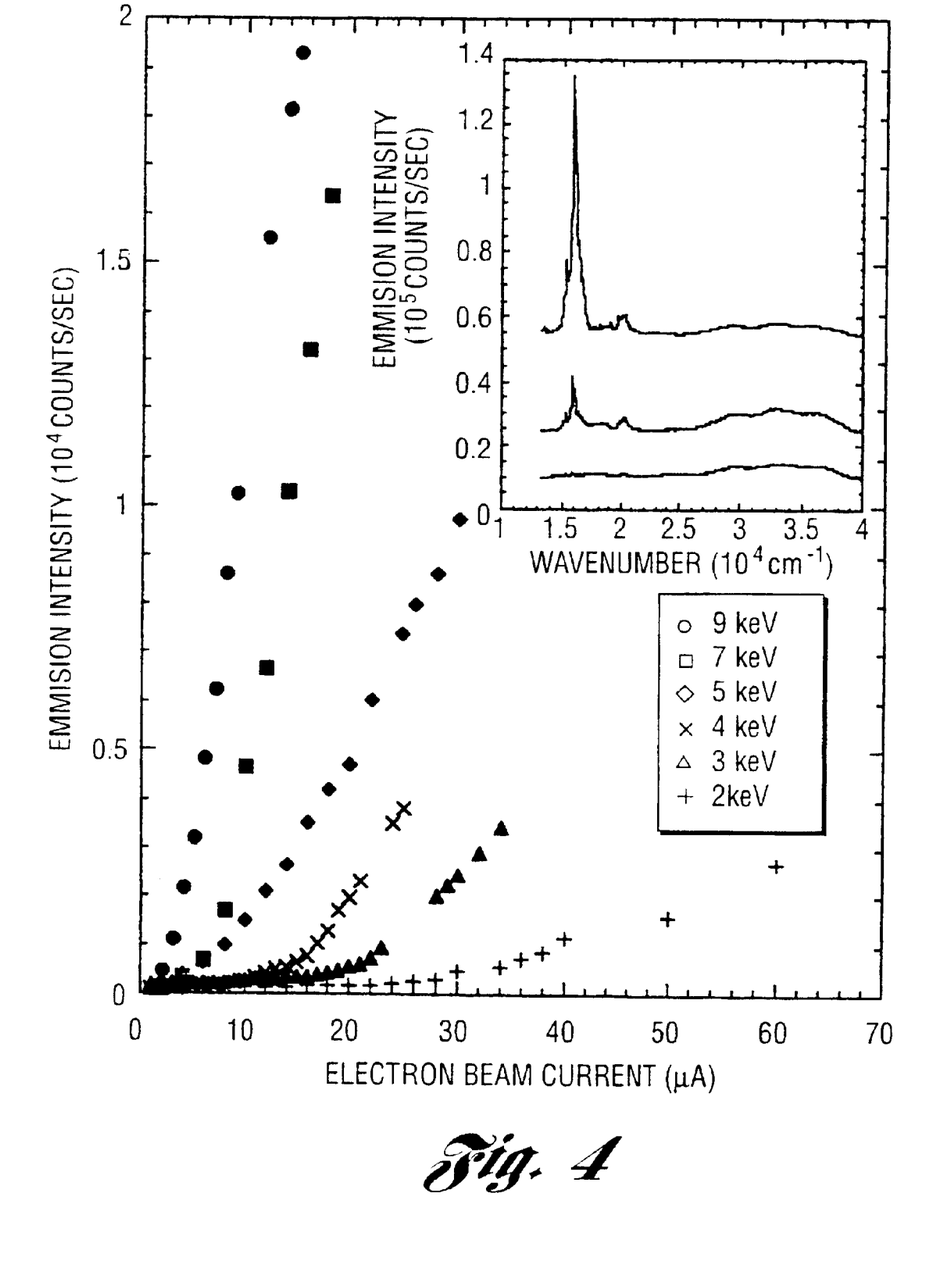
FIG. 4 Emission intensity at room temperature versus electron beam current for Pr: b-$Al_2O_3$ phosphor particles irradiated at various beam voltage levels. The inset illustrates the change in emission spectrum.

The nanosized particles exhibit relatively high emission rates at low input energies compared to phosphors that operate by spontaneous emission. This can be seen most clearly in FIG. 4. The slopes of the emission curves at 60, 35 and 25 $\mu$A where stimulated emission is taking place for the data sets obtained at 2, 3 and 4 keV respectively-are much higher than at 1 $\mu$A where only spontaneous emission is taking place. More than one order of magnitude increase in emission rate can be obtained at voltages of 2, 3 and 4 keV, with respect to the low values observed at current levels below threshold. This represents a significant increase of brightness which may be useful in CRT displays, flat panel displays, in combination with organic light emitting displays and conducting polymer and conducting transparent ceramic displays, television screens, etc. As shown in FIGS. 2 and 4, emission may be substantially linear both above and below a threshold beam current. However, the rate of intensity change abruptly differs on either side of the threshold.

Figure 5:
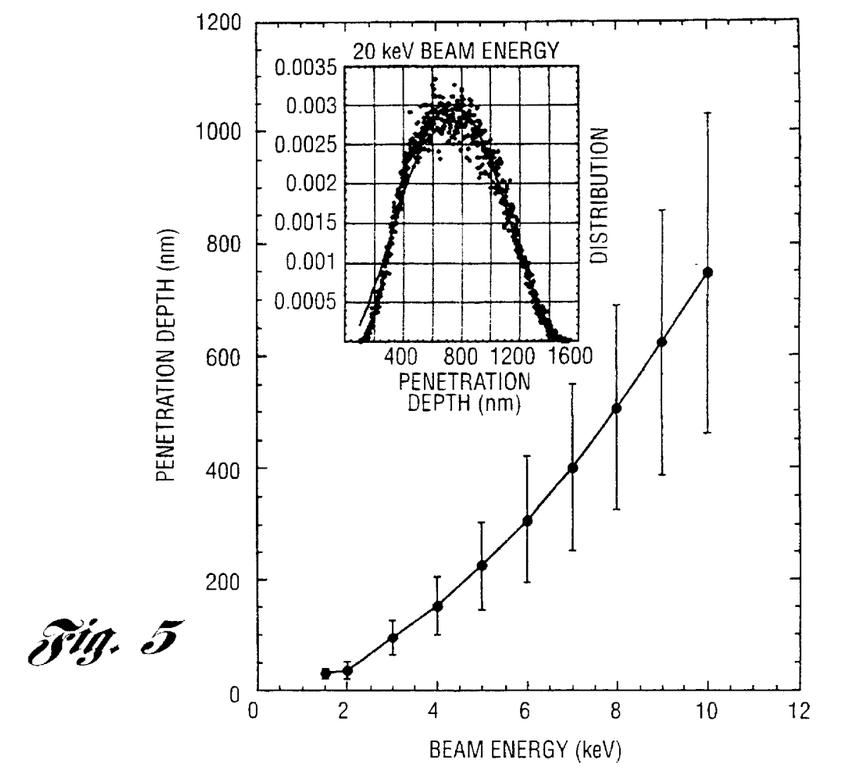
FIG. 5 Monte Carlo simulation of electron penetration of energetic electrons into alumina (calculated by the CASINO routine).

Stimulation of the nanoparticles can be achieved by optical pumping and other means, but most surprising is that stimulation by impinging electrons from electron beams, or other electron sources (e.g., an electric current) can be effective. Electrons do not penetrate far into insulating materials such as oxide powders. However, by an unexpected coincidence, electrons in the 1–4 keV range penetrate a distance somewhat larger than the average transport (propagation) distance in the powder samples of the subject invention. See FIG. 5. Hence the electron-pumped volume and the volume in which the electromagnetic energy resides are essentially the same, and high efficiency should be possible. Whether the host is insulating or non-insulating should make little difference to light sources like those of the present invention in which the light originates within a wavelength of the surface, a region accessible in virtually all materials by electrons of modest energy in the keV range. This mode of stimulation also enables energy states much higher than those generated by optical pumping to participate in the lasing process. Consequently laser action at previously unknown laser wavelengths, such as those of the Nd-doped samples shown here, can (and does) occur.

Figure 6:
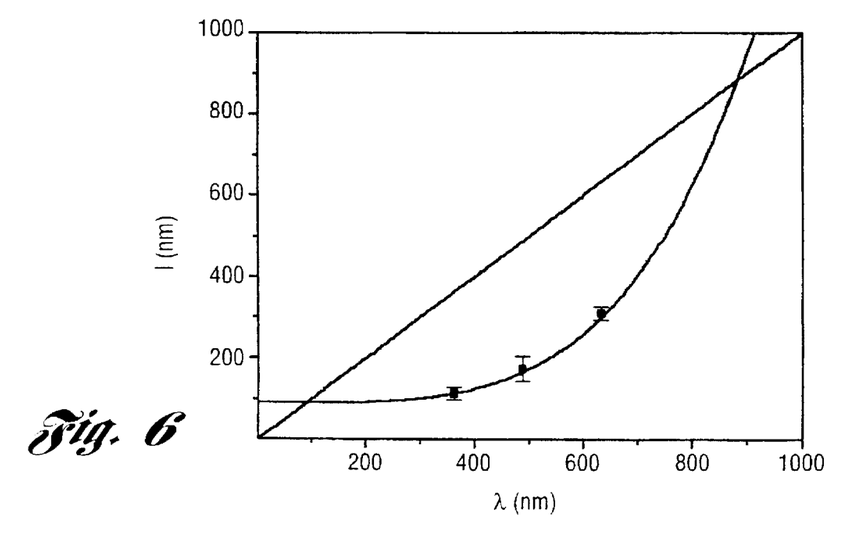
FIG. 6 is a plot of l* versus wavelength showing the range of wavelengths over which strong localization is believed to extend. Strong localization, and hence laser action, should occur at any wavelength where l* is substantially less than the wavelength—hence at any l* where the solid curve falls below the straight line.

To applicant's knowledge, continuous-wave or pulsed lasing activity in regimes where the elastic scattering length $l_{SC}$ and the mean free transport distance l* are both substantially shorter than the wavelength emitted have not been previously disclosed. It is believed that these two requirements may be necessary for continuous-wave laser action mediated by strong scattering, particularly at any reasonable threshold level. Analysis of our measurements (FIG. 3) to determine experimental values of 1* are shown in FIG. 6 and indicate that this condition can be achieved over a wide range of wavelengths. Moreover, it is anticipated that the center wavelength of the localization range and the width of the range can be modified by changing particle size and composition. Thus, the invention further pertains to stimulated emission from a plurality of particles assembled in such a way that the mean scattering length and transport mean free path are less than the wavelength of light emitted. In one published report, H. Cao et al. (Physical Review Letters 82, 2278 (1999) claim to have demonstrated "Random Laser Action in Semiconductor Powder". However the disclosed spectral output of the laser is inconsistent with randomized properties, showing strong angle dependence and the appearance of preferentially amplified frequency components or modes. These characteristics show that their laser is not at all "random". The device described by Cao et al. is believed to be a pulsed, optically-pumped laser which requires a much higher threshold energy density to operate than the particle lasers of the present invention, indicating an altogether different feedback mechanism than accounts for the operation of the present devices.

Thus, the present invention pertains to a simple, highly efficient method of generating ultrafine (2–500 nm diameter) and fine (1–20 $\mu$m diameter) single metal oxide and mixed-metal oxide powders, doped with variable quantities of transition, actinide and/or lanthanide metals such that the resulting powders are of use in devices that exhibit novel luminescence and in selected instances stimulated emission and/or lasing of infrared, visible and/or UV light either selectively or coincidentally. In some instances, the resulting particles contain homogeneous concentrations of dopant metal atoms that are far above the normal, thermodynamic solubility limit for those metals in the matrix. For selected metals, the oxidation state of the metal is not that typically seen in oxide matrices, which offers the potential for novel luminescent behavior. The type of emission and the wavelength can be controlled by changing: (1) the type of matrix oxide, (2) modifying the matrix oxide to contain some amount of fluoride, sulfide, phosphide or nitride or combinations thereof, (3) the dopant element, (4) by using combinations of dopants, and/or (5) by suitable combinations of dopants, matrices and codoped elements. The resulting powders can be stimulated in various ways including electron beam, electron current, plasma, optical, or chemical methods to act as phosphors and/or laser paints (random coherent emitting materials).

The lasing powders are preferably produced at rates of 100s of grams to kilograms of ceramic powder per hour. The preferred process of preparation involves dissolving metal compounds, including, but not limited to alkoxides, carboxylates and/or selected compounds and/or their salts in alcohol or other flammable solvent and creating an aerosol mist of this solution by using oxygen or air jets. The resulting aerosol mist is passed through a heat source that ignites the aerosol. The flammable solvent and any organic or combustible or volatile inorganic ligands are burned away from the metal(s) creating nanosized, nearly unagglomerated oxide powders that are compositionally close to the starting solution compositions and frequently single crystal materials. This process is called flame spray. pyrolysis (FSP). Although FSP is the preferred method; practitioners of the art will recognize that this is. only one of many ways that might be practiced to produce related powders. FSP methods are preferred because they provide access to kinetic products that are not normally accessible by other methods.

To produce transition metal, actinide and/or lanthanide doped fine and ultrafine metal oxide powders by flame spray pyrolysis, it is preferred that the precursors be soluble in organic solvents and that the metals form molecular interactions. Metal alkoxides, especially those stabilized through the use of multidentate chelates, e.g. triethanolamine and triisopropanolamine, e.g., alumatranes, are preferred because the chelation provides enhanced stability towards hydrolysis and provides an excellent platform for forming double and triple alkoxides as in Laine, et al. U.S. Pat. No. 5,958,361 (Sep. 28, 1999), incorporated herein by reference. However, the use of metal carboxylates, especially those that are soluble in organic solvents and in particular those that form mixed-metal carboxylates can also be used when desirable alkoxide complexes are not available or are insufficiently stable for FSP purposes. Both alkoxides and carboxylates are especially preferred because they are easily and inexpensively made from a wide variety of starting materials. In situations where neither alkoxides nor carboxylates are available or are to difficult to work with, then metal nitrates can be used, or a variety of organometallic compounds. However, both these options are less preferable, as the metal nitrates can form explosive mixtures with organic solvents, and organometallic compounds are costly and sometimes not stable for long periods of time. Metal chlorides are not preferred because of the toxic, corrosive and polluting nature of the flame pyrolysis byproducts.

The preferred solvents are butanol, methanol, and most especially ethanol because of its relatively high fuel value, e.g. as compared to methanol. However other solvents can also be used as well as solvent mixtures. The preferred reaction temperatures are 500–2500° C. with the most preferred temperatures being at about 900–2000° C. The solids loading in solution ranges from 0.1 to 30% with the preferred loading being 1–20% and the most preferred being in the range of 1–10% by weight.

The preferred feed rates are dependent on the size of the combustion chamber and the solids loading of the solution. For systems such as that described in U.S. Pat. No. 5,958,361, the feed rates can be from about 1 to 100 ml/min with the preferred rate being 5–50 ml/min with the most preferred rate being about 10–40 ml/min. Much faster feed rates are possible with lower loadings and conversely slower feed rates are preferred with higher loadings.

The preferred composition for the doped nanopowders are for the dopant levels to be between 0.1 ppm and 20 mole percent of the matrix material, with the preferred range being between 0.1 and 500,000 ppm. In some embodiments it is preferred that two or more dopants be used simultaneously.

The preferred matrix particle sizes can be between 1 nm and 500 nm with more preferred ranges being between 1 and 100 nm and the most preferred range being between 1 and 30 nm, especially if quantum confinement properties are desired.

The preferred matrix materials can be alumina derivatives (e.g. δ-alumina, α-alumina, β-alumina, yttrium aluminum garnet, spinel, etc.), rare earth oxides including yttria, silicates (e.g. fosterite, mullite, etc.) zinc oxide, indium and tin oxides and indium tin oxide, and mixtures of these metal oxides. Particularly preferred matrix materials are those that form easily by FSP including δ-alumina, α-alumina, β"-alumina, yttria, and spinel. In some instances, it may be beneficial to pretreat these matrices with ammonia or sulfides or fluoride containing materials to modify the oxide matrix to contain nitrogen, sulfide or fluoride, including systems where the oxygen content is minimal, e.g., $(Y_{0.919}Yb_{0.08}Tm_{0.001})_2S_3$.

Previous efforts have demonstrated "laser paint" action in dielectric micron-sized oxide powders using high-energy, short optical pulse pumping. The present inventors have used electron pumping to demonstrate "laser paint" emission in nanosized, doped dielectric powders. The present inventors have also examined strong scattering conditions to search for evidence that the onset of recurrent scattering trajectories, which begin and end on the same site, facilitate laser action, S. John and G. Pang, "Theory of lasing in a multiple-scattering medium," Phys. Rev. A54, 3642–3652 (1996), and localization. D. Wiersma and A. Lagendijk, "Light diffusion with gain and random lasers," Phys. Rev. E54, 42564265 (1996).

As result of intensive experimentation, continuous-wave "random" laser sources have been demonstrated. Both ultraviolet and visible laser radiation in the strong scattering regime have been demonstrated in dry, rare earth nanopowders excited by a low current, low voltage electron beam. By contrast, earlier reports of pulsed laser action in powders were all optically-pumped experiments in rare earth material in the diffusive regime V. M. Markushev, V. F. Zolin, and Ch. M. Briskina, Sov. J. Qu. El. 16, 281 (1986); C. Gouedard, D. Husson, C. Sauteret, F. Auzel, and A. Migus, J.O.S.A. B10, 2358–2363 (1993); M. A. Noginov, N. E. Noginov, H. J. Caulfield, P. Venkateswarlu, T. Thompson, M. Mahdi, and V. Ostroumov, J.O.S.A. B13, 2024 (1996) or in semiconductor powders exhibiting frequency selectivity within the transition bandwidth H. Cao, Y. G. Zhao, S. T. Ho, E. W. Seelig, Q. H. Wang, and R. P. H. Chang, Phys. Rev. Lett. 82, 2278 (1999). Observations of laser modes within the transition bandwidth and angular variation of the mode distribution however rule out the possibility that the recurrent scattering paths responsible for lasing are from regions of the random medium smaller than hall a wavelength in size. When recurrent scattering provides feedback for lasing from source volumes less than $(\lambda/2)^3$, the constructive and destructive interference of light required to produce frequency selectivity in the optical range cannot occur. For effective laser source volumes smaller than this, the stimulated emission spectrum should occupy the full gain bandwidth, be independent of viewing angle (because of directional randomization from scattering) and exhibit no speckle, consistent with strong localization and with truly random laser properties. In the phosphors described in the present invention all these unusual features, together with conventional indicators of laser action such as sharp thresholds, gain-narrowing, linear output and quenching of competing transitions from the upper state, have been observed.

It was first necessary to develop methods of synthesizing doped, preferably lanthanide doped, nanosized powders, preferably alumina-based powders, by FSP. The methods of FSP production are described in U.S. Pat. No. 5,958,361, incorporated herein by reference, and describe the general methods for producing oxide nanopowders. The FSP method was modified by employing ethanol soluble and ethanol stable alkoxide precursors of the matrix oxides, and mixing ethanol soluble rare earth salts to provide dopant atoms. In addition, ethanol soluble metal carboxylates and other compounds can also be used in place of alkoxides. Finally, although not preferable because of cost, handling difficulties, and potential toxicity and pollution problems, a variety of organometallic and nitrate precursors to the matrix oxides can also be used. The methods employed in the synthesis are general examples that are not meant to be limiting.

To be suitable for use as lasing particles according to the subject invention, the particles must be smaller than 1.5 μm, and generally must range in size from somewhat less than 1 nm to about 150 nm, more preferably in the range of 1 nm to 50 nm, with a range of 1 nm to 30 nm being preferred. In addition to the metal oxide or mixed-metal oxide, each particle, on average, must contain at least one dopant atom. The actual number of dopant atoms will vary with the size of the particles, and may range, for example from 1 or 2 atoms per particle for particle sizes less than 10 nm to $10^4$ or more dopant atoms in 100 nm particles. Larger particles will generally contain yet more dopant atoms.

The metal oxides are any metal oxides that which can be processed into particles of the requisite size and dopant concentration. Most preferably, the metal oxides are those which can produce particles by flame spray pyrolysis and like processes, for example metal oxides which can be prepared from precursors which are soluble in flammable solvents, and which, upon combustion, generate relatively pure oxides. Most preferably, the metal oxides are selected from aluminum oxide and yttrium oxide, and mixtures thereof. However, oxides such as boron oxide, titanium dioxide, tin oxide, lead oxide, indium oxide, ytterbium oxide, silicon dioxide, and other oxides and mixtures thereof are other suitable candidates. In general, the oxides should be those which when produced by pyrolysis in FSP, produce a particle having a well-defined crystal lattice. However, amorphous and mixed amorphous/crystalline lattices may also be suitable.

The dopant atoms are those which, when the particles are subjected to appropriate energy input, result in stimulated emission. Preferred dopant atoms are transition metal, lanthanide and actinide metal ions. Preferred are all the rare earth ions (RE) including Ce, Eu, Tm and Pr. Other examples are mixtures of dopant atoms, for example $(Y_{0.919}Yb_{0.08}RE_{0.001})_2O_3$ where RE could be any of the other rare earth ions, with the exception of $Gd^{3+}$ which has no low-lying states able to accept energy from $Yb^{3+}$ (Note: conversely $Yb^{3+}$ has no intermediate states to facilitate acceptance of energy from the high-lying $^6P_{7,2}$ state of $Gd^{3+}$). Trivalent Tm, Er, Ho, Sm, and Pr are particularly suitable as co-dopants with Yb.

Having generally described this invention, a further understanding can be obtained by reference to certain specific examples which are provided herein for purposes of illustration only and are not intended to be limiting unless otherwise specified.

EXAMPLES

Example 1

In a 2 L round bottom flask, 199.9 g (2.190 mol) of Al$(OH)_3 \cdot 0.72H_2O$, 326.7 g (2.190 mol) triethanolamine (TEA) and 1 L ethylene glycol (EG) are mixed with constant stirring (magnetic). The reaction is heated to ≈200° C. to distill off EG and byproduct water. After ~2 h, the reaction turns clear, indicating that formation of a soluble [Al(TEA)]$_3$ complex is complete. Then, 13.71 g (0.343 mol) of NaOH and 2.84 g (0.068 mol) of LiOH.H$_2$O are added, and the reaction is refluxed for 1 h. The metal molar ratio used (Na:Al:Li=1.67:10.67:0.33) represents the previously determined optimum doping level. The reaction is then distilled under N$_2$, first to remove by-product water then excess EG, until the residue is too viscous to stir. On cooling, a glassy, orange/yellow solid is recovered from the flask and diluted with EtOH to create a 1–8 wt % residual ceramic solution. To this solution between 0.975 g (0.0022 mol) and 0222 g (0.0005 mol) of thulium nitrate pentahydrate was added. The doped solution was converted to an ultrafine oxide by flame spray pyrolysis.

Example 2

Aluminum tri-sec-butoxide (Aldrich) was purified by distillation under vacuum. In a N$_2$ Dri-Box, the purified aluminum tri-sec-butoxide, 250 g (1.015 mol) was slowly added to a stirred mixture to 155 g (1.039 mol) triethanolamine and 250 ml isopropanol. Within 2 h, the triethanolamine displaces the sec-butanol to form an air and water stable alumatrane. The resultant alumatrane in sec-butanol and isopropanol was diluted with. ethanol to create a 2 wt % residual ceramic solution. To this solution 0.250 g (0.0006 mol) of cerium nitrate hexahydrate or 0.250 g (0.0006 mol) of gadolinium nitrate hexahydrate or 0.250 g (0.0006 mol) of neodymium nitrate hexahydrate or 0.250 g (0.0006 mol) of holmium nitrate pentahydrate or 0.250 g (0.0006 mol) of europium nitrate pentahydrate or 0.250 g (0.0006 mol) of terbium nitrate pentahydrate or 0.250 g (0.0006 mol) of thulium nitrate pentahydrate was added. This is equivalent to 1000 ppm dopant level. The doped solution was converted to an ultrafine oxide by flame spray pyrolysis. The visible and infrared emissions spectra of $Nd^{3+}$: δ-$Al_2O_3$ (FIG. 1(b), exhibit laser thresholds of approximately 20 and 60 μA respectively, as indicated in FIGS. 2(b) and 2(d).

Example 3

Figure 1A:
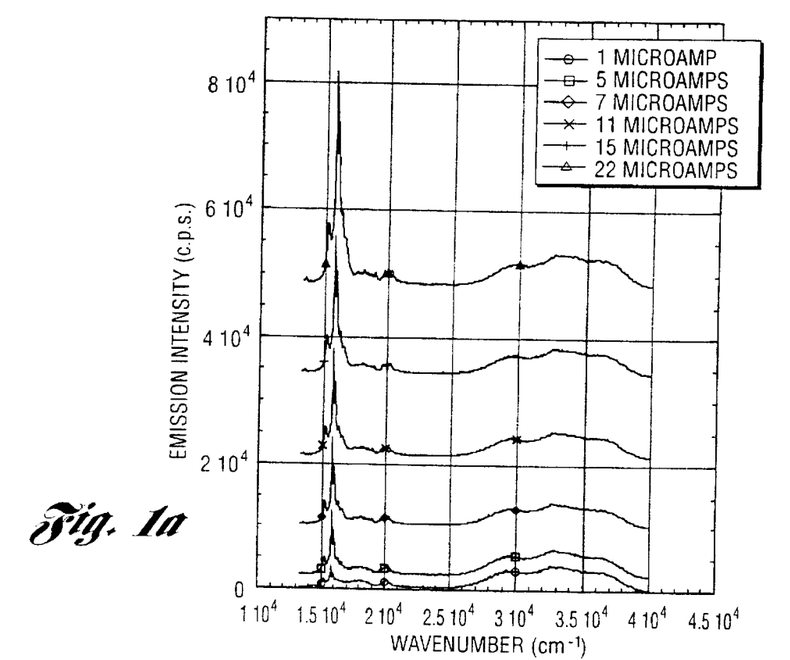

Particles of δ- (or β"-) alumina were synthesized by flame spray pyrolysis of metallo-organic precursors, and a dopant level of 1000±100 ppm $Ce^{3+}$ (or $Pr^{3+}$) ions was easily achieved. An alumatrane (N(CH$_2$CH$_2$O)$_3$Al) precursor was used, consisting of alumatrane, 2 wt % Al$_2$O$_3$ and 0.003% CeO$_2$ or PrO$_2$ in ethanol, and produced powders by combustion A. C. Sutorik, S. S. Neo, T. flinklin, R. Baranwal, D. R. Treadwell, R. Narayanan, and R. M. Laine, J. Am. Ceran. Soc. 81, 1477–1488 (1998); R. M. Laine, K. Waldner, C. Bickmore, D. Treadwell, U.S. Pat. No. 5,614,596 (March 1997) at a rate of 50 g/hr. Particle sizes and concentrations were estimated using BET S. Brunauer, P. H. Emmett, and E. Teller, J. Am. Chem. Soc. 60, 309(1938) surface areas (79.5±1 and 43.2±0.2 m$^2$/g for Ce and Pr) and x-ray line-broadening. The unaggregated, single crystal nature of the particles was confirmed by transmission electron microscopy. Dopant concentration corresponded to 75 dopant ions per 20 nm particle in the case of Ce-doping and 800 dopant ions per 40 nm particle for Pr. As-grown powders were excited at low current and voltage with an electron beam to record optical emission spectra, and coherent back-scattering experiments at several wavelengths were performed to measure l*(λ), the mean distance over which fields propagate before becoming directionally-randomized. To do so, loose powder samples were lightly pressed into a shallow, disk-shaped recess machined into an oxygen-free copper holder and placed in an ultrahigh vacuum chamber operated at a pressure of 7×10$^{-10}$ Torr. Electrons with energies in the 1–10 keV range were lightly focused to spot diameters in the range ϕ=2–7 mm on the sample. Luminescence was analyzed through a MgF$_2$ optical port with a 1 meter Czerny-Turner spectrometer. At various electron beam currents and at room temperature, the spectra of $Pr^{3+}$: β-Al$_2$O$_3$ in FIG. 1 shows that red, green and blue emission lines are evident, and that the cathodoluminescence is whitish-yellow to the naked eye.

Example 4

Aluminum tri-sec-butoxide (Aldrich) was purified by distillation under vacuum. In a N$_2$ Dri-Box, the purified aluminum tri-sec-butoxide, 250 g (1.015 mol) was slowly added to a stirred mixture of 155 g (1.039 mol) triethanolamine and 250 ml isopropanol. Within 2 h, the triethanolamine displaces the sec-butanol to form an air and water stable alumatrane. The resultant alumatrane in sec-butanol and isopropanol was diluted with ethanol to create a 2 wt % residual ceramic solution. To this solution 0.217 g (0.0005 mol) of cerium nitrate hexahydrate and 0.219 g (0.0005 mol) of neodymium nitrate hexahydrate was added. The doped solution was converted to an ultrafine oxide by flame spray pyrolysis.

Example 5

The alumatrane of Example 4 in sec-butanol and isopropanol was diluted with ethanol to create a 1 wt % residual ceramic solution. To this solution 0.217 g (0.0005 mol) of cerium nitrate hexahydrate and 0.219 g (0.0005 mol) of neodymium nitrate hexahydrate was added. The doped solution was converted to an ultrafine oxide by flame spray pyrolysis.

Example 6

The alumatrane of Example 4 in sec-butanol and isopropanol was diluted with ethanol to create a 8 wt % residual ceramic solution. To this solution 0.217 g (0.0005 mol) of cerium nitrate hexahydrate was added. The doped solution was converted to an ultrafine oxide by flame spray pyrolysis. The degree of doping of particles of a given size from this experiment was calculated as follows.

Degree of doping of a selected ceria doped $\delta$-$Al_2O_3$

Density of $Al_2O_3$ 3.98 g/cc

Unit weight 101.96128 g/mol

| Particle diameter | Weight of particle | Units per particle | Number of dopant atoms per particle |
|---|---|---|---|
| 5 | 2.60E-19 | 1538 | 2 |
| 10 | 2.08E-18 | 12304 | 12 |
| 12 | 3.60E-18 | 21261 | 21 |
| 18 | 1.22E-17 | 71756 | 72 |
| 20 | 1.67E-17 | 98431 | 98 |
| 22 | 2.22E-17 | 131012 | 131 |
| 26 | 3.66E-17 | 216253 | 216 |
| 27 | 4.10E-17 | 242178 | 242 |
| 28 | 4.57E-17 | 270095 | 270 |
| 30 | 5.63E-17 | 332205 | 332 |
| 50 | 2.60E-16 | 1537988 | 1538 |
| 70 | 7.15E-16 | 4220239 | 4220 |
| 100 | 2.08E-15 | 12303903 | 12304 |

Example 7

In a 2 L flask, 25.00 g of indium acetate and 1.87 g of dibutyl tin diacetate were dissolved in 1 L of ethanol to create a 2 wt. % residual ceramic solution. The solution was converted to an ultrafine oxide by flame spray pyrolysis. The fine powder, failing to contain dopant atoms, is not expected to lase.

Example 8

In a 2 L flask, 25.00 g of indium acetate and 1.87 g of dibutyl tin diacetate and 0.023 g of $Pr(NO_3)_3 6H_2O$ were dissolved in 1 L of ethanol to create a 2 wt. % residual ceramic solution. The doped solution was converted to an ultrafine oxide by flame spray pyrolysis. The powder obtained, when appropriately stimulated, for example by light, electron beam, electron current or other means, is expected to lase.

Example 9

In a 2 L flask 0.1904 mol (145.87 g) of yttrium nitrate hydrate, 0.0177 mol (15.912 g) of ytterbium nitrate hydrate and 0.0133 mol (11.780 g) of erbium nitrate hydrate were dissolved in 1250 g of ethanol to make a 4 wt. % ceramic solution. This solution was then converted to a nano oxide ceramic of composition; $(Y_{0.86}Yb_{0.06}Er_{0.08})_2O_3$ by the FSP process. The material was primarily the cubic phase with some monoclinic. Particle sizes were typically 20 to 100 nm ave. particle size depending on solution concentration used.

| Green Emitting Particles | Target (mol %) | Actual (mol %) |
|---|---|---|
| Y | 0.86 | 0.863 |
| Yb | 0.08 | 0.796 |
| Er | 0.06 | 0.0570 |

For the powders produced in example 6 the following analyses were done.

Specific surface area analysis (SSA) was conducted at 77k using a Micromeritics ASAP 2000 sorption analyzer (Norcross, Ga.) with N2 as the adsorbate gas. Samples were degassed at 395° C. for 4 h or until the out gas rate was <5 $\mu$m Hg/min. SSAs were calculated using the BET multipoint method with five data points with relative pressures between 0.001 and 0.20. The analysis was done using the software package supplied with the instrument. The particle size was calculated from the SSA based on spherical non-aggregated particles. The surface area was determined to be 55.0 $m_2$/g which corresponds to an average particle diameter of about 27.4 nm based on the following table equating SSA with average particle size.

| SSA | Particle diameter (nm) |
|---|---|
| 10 | 151 |
| 20 | 75 |
| 30 | 50 |
| 40 | 38 |
| 50 | 27.4 |
| 55 | 25 |
| 60 | 25 |
| 70 | 22 |
| 80 | 19 |
| 90 | 17 |
| 100 | 15 |
| 110 | 14 |
| 120 | 13 |

XRD line broadening. The doped $\delta$-$Al_2O_3$ powder samples were analyzed by powder X-ray diffraction using a Rigaku Rotating Anode Goniometer (Rigakeu Denki Co., Ltd., Tokyo, Japan). The powder was packed into an amorphous quartz specimen holder and placed into the goniometer. Scans were measured from 10° to 60° 2θ at a scan rate of 2° 2θ/min using 0.05° 2θ incrments and CuKα radiation operating at 40 kV and 100 mA. Peak positions were compared with standard ICDD files to identify crystalline phases. For line broadening analysis, scans were measured from 33° to 36° 2θ at a scan rate of 0.2° 2θ/min using 0.005° 2θ increments and CuKα radiation operating at 40 kV and 100 mA. The $\delta$-$Al_2O_3$ peak centered at 34.6 2θ was chosen for the calculations because it is fully resolved from other peaks in the XRD pattern. This peak was compared to the 26.54° 2θ peak of a single crystal quartz standard for Debye-Scherrer crystallite size calculations. An average particle size of 42.6 nm is calculated-using the basic Debye-Scherrer equation. However when the analysis was done using the software package supplied with the instrument, which accounts for slit sizes, operating voltage and current and uses a non-simplified form of the Debye-Scherrer equation, the average particle diameter is calculated to be 27.7 nm.

Assessment of Stimulated Emission

Figure 7:
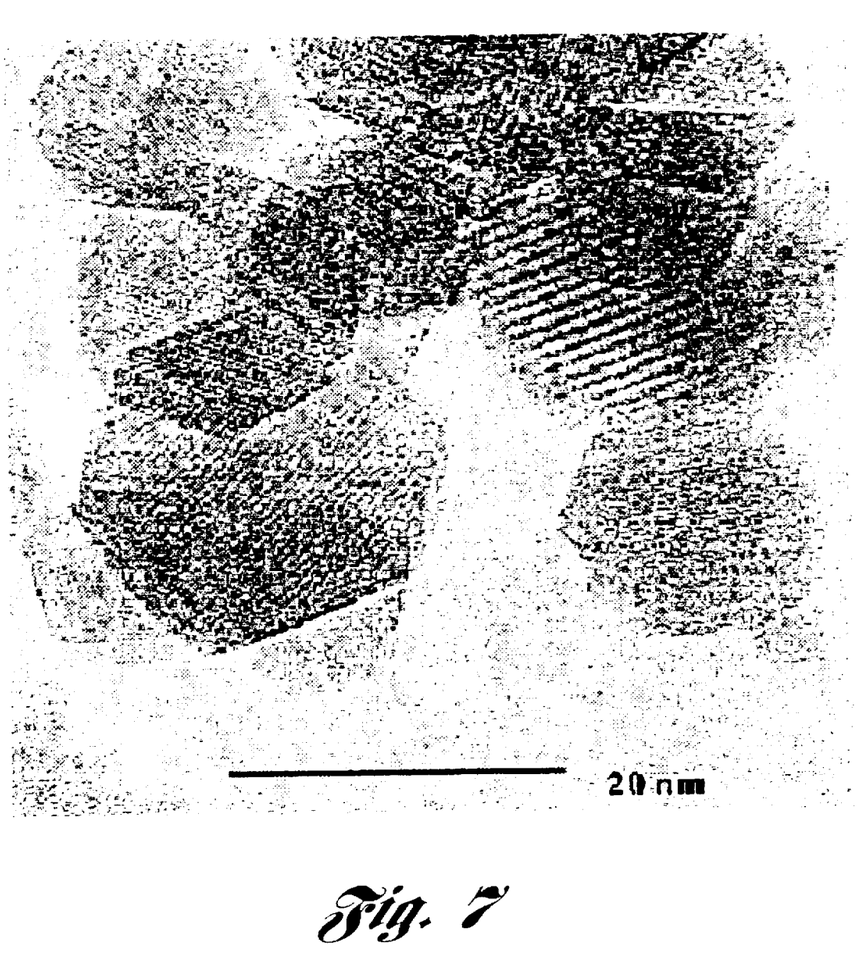
FIG. 7 is a scanning electron micrograph of Ce-doped $\delta$-alumina nanoparticles.

A wide variety of powders were prepared doped with various lanthanide metals including: Er, Ce, Nd, Pr and Tu. As processed FSP n-δ-alumina doped with 1000 ppm of $Ce_{3+}$, φ=30, is illustrated in FIG. 7. Doping levels reached parts-per thousand to produce homogeneously doped particles despite the fact that the solubility of most lanthanide metals in alumina is at the parts-per-thousand level. These particles are δ-alumina as determined by XRD powder patterns. These particles have ave. dia. of ≈30 nm as determined by BET analysis, Example 6. The typical particle sizes used for the lasing studies discussed below are in the 10–30 nm range as confirmed by both BET analyses and x-ray diffraction line broadening. The total number of dopant atoms ranged from about 50 to 500 per particle depending on the dopant, the matrix and the relative concentrations.

Electron Pumped Luminescence From Doped Oxide Nanopowders

Weak electronic excitation in doped oxide nano-particles readily generates stimulated emission at room temperature and coherent back-scattering measurements confirm that the particles are lossless on length scales of both the scattering mean free path l and the transport mean free path l*. Even at the visible and ultraviolet wavelengths (λ) of the experiments, conditions adequate to produce electromagnetic localization exist (l,l*<<,λ). Electron excitation can easily sustain continuous wave, infrared, blue light and ultraviolet laser action in this regime.

The size distribution of the powders is broad, and accurately log-normal. For some of the experiments, Nd and Ce dopants were incorporated into samples at various Nd/Ce ratios and concentrations of roughly 240 dopant ions per particle of average diameter 27 nm. The loose powders were lightly pressed into a shallow, disk-shaped recess machined into an oxygen-free copper holder and placed in an ultrahigh vacuum chamber operating at a pressure of $9 \times 10^{-10}$ Torr. A steerable beam of electrons with energies in the 0.5–10 keV range was lightly focused to a spot diameter between φ=2–7 mm on the sample, and luminescence through an optical port was analyzed with a 1 meter Czerny-Turner spectrometer with a holographic grating blazed for 250 nm.

Figure 1B:
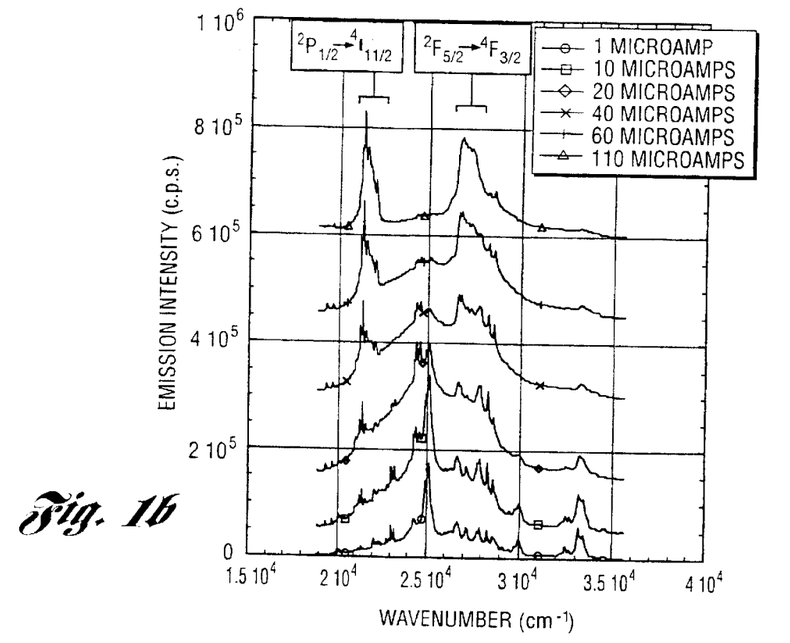

At 8 keV, a series of spectra was recorded versus electron beam current at room temperature in $Nd,Ce:Al_2O_3$ nanoparticles (FIG. 1(b)). A broad background underlying all the rare earth spectra between 350–450 nm resembled the spectrum of the undoped host (not shown), suggesting that it derived from intrinsic point defects in the alumina. At 1 μA (bottom trace), the cathodo-luminescence revealed many sharp lines corresponding to the primary dopant $Nd^{3+}$. A prominent line, at 25,000 $cm^{-1}$ (400 nm), was assigned to the $^2F_{5/2}-^4F_{7/2}$ transition of $Nd^{3+}$. As the excitation level was increased above 20 mA, three emission lines originating from the $^2F_{5/2}$ state (at 25,000, 32,500 and 34,500 $cm^{-1}$) were quenched. Simultaneously, a fourth transition ($^2F_{5/2}-^4F_{3/2}$) at 27,000 $cm^{-1}$ originating from the same ($^2F_{5/2}$) upper state grew rapidly in intensity. In similar fashion, a spectral line at 23,000 $cm^{-1}$ corresponding to the $^2P_{1/2}-^4F_{9/2}$, transition was quenched at 20 μA, whereupon a second feature ($^2P_{1/2}-^4I_{11/2}$ transition at 21,300 $cm^{-1}$) originating from the same ($^2P_{1/2}$) state was observed to grow rapidly with increasing current.

The dramatic spectral redistribution of $Nd^{3+}$ emission evidenced in FIG. 1(b), as excitation current was increased, is consistent with the onset of optical gain. As the result the possibility of achieving laser action on dopant transitions in the samples is apparent. This, together with the apparent absence of intense $Ce^{3+}$ emission in the initial sample, prompted examination of powders with predominantly $Ce^{3+}$ doping.

Figure 1C:
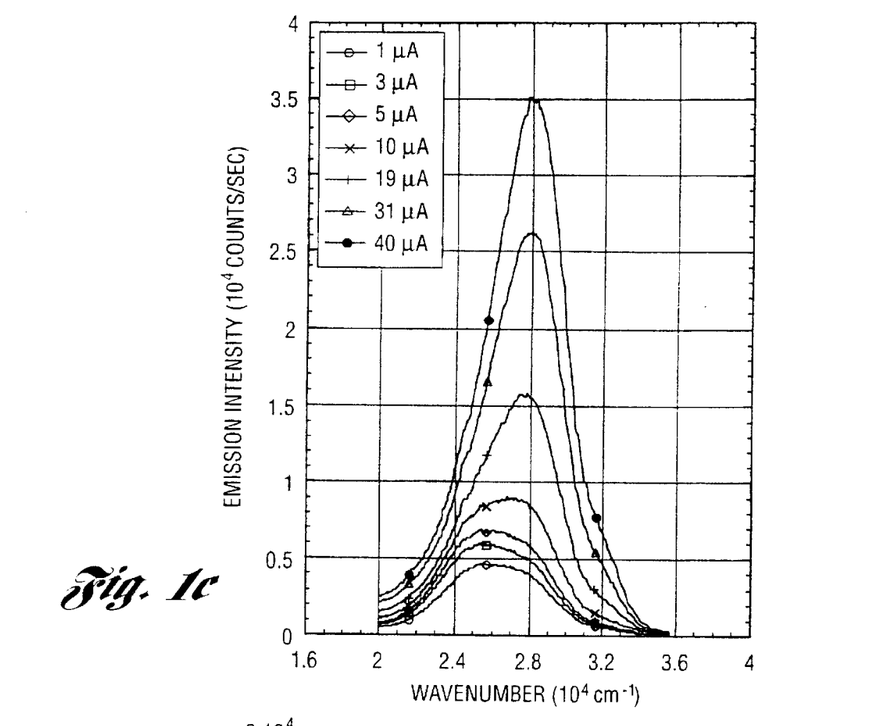

Spectra recorded from samples with heightened Cerium doping showed emission primarily from $Ce^{3+}$, as indicated in FIG. 1(c). In this case, a broad feature centered at 28,000 $cm^{-1}$ dominated the spectrum. A small shoulder was observed ~2.500 $cm^{-1}$ higher in energy, consistent with the $Ce^{3+}$ (4f) ground state splitting, which for fluoride crystals is approximately 2,100 $cm^{-1}$. D. J. Ehrlich, P. F. Moulton, and R. M. Osgood, Jr., "Ultraviolet solid-state Ce:YLF laser at 325 nm," Opt. Lett. 4, 184–186 (1979). In many materials, the short wavelength (5d-$^2F_{5/2}$) component of the 5d–4f inter-configurational transition of $Ce^{3+}$ is higher intensity, than its long wavelength companion 5d-$^2F_{7/2}$. D. J. Ehrlich, P. F. Moulton, and R. M. Osgood, Jr., "Ultraviolet solid-state Ce:YLF laser at 325 nm," Opt. Lett. 4, 184–186 (1979); S. Mroczkowski and P. Doran, "Preparation of $Rb_2NaYF_6$:$Ce^{3+}$ and $Cs_2NaYF_6$:$Ce^{3+}$—Prospects for tunable lasers of blue-green wavelength," J. Less-Common Metals 110, 258–265 (185); A. A. Kaminskii, S. A. Kochubei, K. N. Naumochkin, E. V. Pestryakov, V. I. Trunov, and T. V. Uvarova, "Amplification of ultraviolet radiation due to the 5d–4f interconfigurational transition of the $Ce^{3+}$ ion in $BaY_2F_8$," Sov. J. Qu. Elect. 19, 340–342 (1989); J. F. Pinto, G. H. Rosenblatt, L. Esterowitz, V. Castillo and G. J. Quarles, "Tunable solid-state laser action in $Ce^{3+}$:$LiSrAlF_6$," Electr. Lett. 30, 240–241 (1994); C. D. Marshall, J. A. Speth, S. A. Payne, W. F. Krupke, G. J. Quarles, V. Castillo and B. H. T. Chai, "Ultraviolet laser emission properties of $Ce^{3+}$-doped $LiSrAlF_6$ and $LiCaAlF_6$," J.O.S.A. B11, 2054–2065 (1994); N. Sarukura, M. A. Dubinskii, Z. Liu, V. V. Semashko, A. K. Naumov, S. L. Korableva, R. Y. Abdulsabirov, K. Edamatsu, Y. Suzuki, T. Itoh, and Y. Segawa, "$Ce^{3+}$-activated fluoride crystals as prospective active media for widely tunable ultraviolet ultrafast lasers with direct 10-ns pumping," I.E.E.E. J. Select. Topics in Qu. El. 1, 792 (1995); B. Huttl, U. Troppenz, K. O. Veithaus, C. R. Ronda, and R. H. Mauch, "Luminescence properties of SrS: $Ce^{3+}$," J. Appl. Phys. 78, 7282 (1995). The relatively weak shoulder at short wavelengths in FIG. 1(c) may indicate substantial resonant re-absorption at this wavelength by 4f gorund state ions or point defects.

The FIG. 1(c) spectra exhibit striking evidence of stimulated emission from $Ce^{3+}$. When the peak (or integrated) intensity of the, Ce ultraviolet emission is plotted vs electron current, an abrupt change in slope is observed at room temperature (FIG. 2(c)). This is accompanied by a 30%, narrowing of the emission spectrum. The sigmoidal linewidth variation in the inset of FIG. 2(c) demonstrates this spectral narrowing, which occurs at the same current level as the change in slope. These observations of stimulated emission with a threshold and spectral narrowing furnished strong evidence of continuous-wave ultraviolet laser action on the 361 nm inter-configurational 5d-4f transition of $Ce^{3+}$.

Figure 3A:
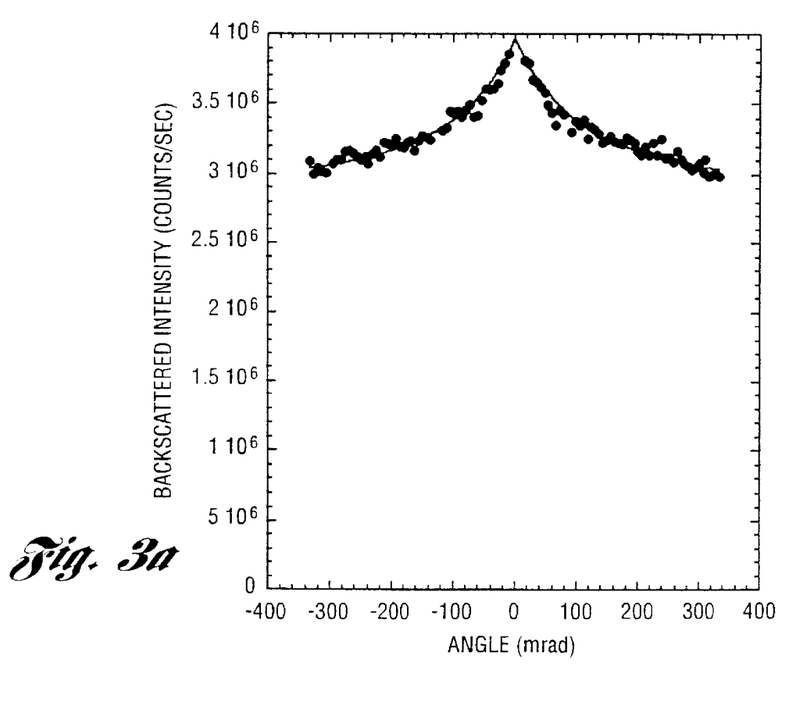
Figure 3B:
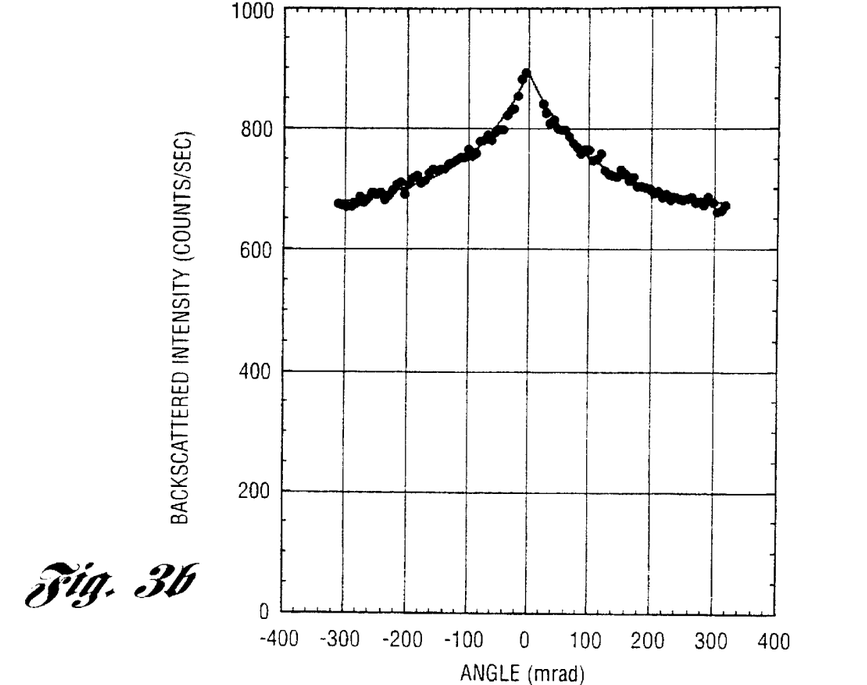
Figure 3C:
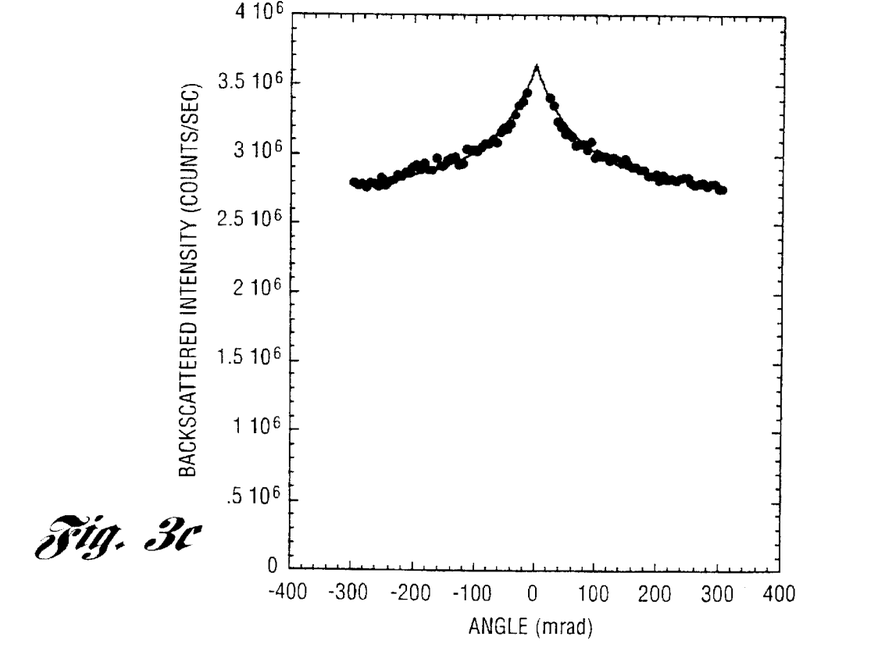

Next, the scattering conditions in the alumina powder samples were evaluated in coherent back-scattering experiments, using a simple scanning-detector apparatus. A stepper-motor-controlled translator was used to scan a flat plate which pivoted about the sample mount. In this way, a photomultiplier and filter assembly mounted on the plate were scanned angularly about the exact back-scattering direction. Probe light at a wavelength of 488 nm, chosen to overlap one of the transitions exhibiting gain, was selected from the output of an Ar ion laser using a small monochromator, and directed after collimation to the sample surface using a miniature turning mirror. By choosing the detector aperture and translator step-size to correspond to the solid angle of scattered light subtended by the turning mirror, only a few angular positions near exact back-scattering were eclipsed by the mirror. The results are shown in FIG. 3. For $Ce^{3+}$, a filtered ultraviolet $Ar^+$ laser with output at 363.8 nm was used. For Pr doped samples, or He—Ne laser at 632.8 nm was employed.

The data clearly show a broad back-scattering cone, as expected for small particles with a short transport mean free path $l^*$. The mere observation of the coherent scattering contribution near $\theta=0$ indicates that the medium is lossless on the length scale of $l^*$. E. Akkermans, P. E. Wolf, R. Maynard, and G. Maret, "Theoretical study of the coherent backscattering of light by disordered media," J. Phys. (Fr) 49, 77–98 (1988). This is significant in itself, in that net optical gain would not be favored in the presence of significant absorption. Additionally however, it is possible to determine $l^*$ directly from analysis of the back-scattering cone at small angles. Accounting for internal reflection, we obtained a value of $l^*=144\pm31$ nm was obtained from a least squares fit to the data of FIG. 3(c), using the expression for $<I(0)I(q)>/<I>^2$ from J. X. Zhu, D. J. Pine, and D. A. Weitz, "Internal reflection of diffusive light in random media", Phys. Rev. A44, 3948–3959 (1991). This confirmed that our experiments were performed in an extreme scattering regime, where $l^*<<\lambda$ over the entire range of wavelengths investigated.

Returning to the $Nd^{3+}$ system, the dramatic spectral redistribution evidenced in FIG. 1(b), as excitation current was increased, is consistent with the onset of stimulated emission on two emission features of $Nd^{3+}$ above 20 $\mu A$. The initially dominant group of $^2F5/2-^4F_{7/2}$ lines of $Nd^{3+}$ at 25,000 $cm^{-1}$ as well as the $^2F_{5/2}-^4I_{15/2}$ and $^2F_{5/2}-^4I_{13/2}$ lines, quenched suddenly as the current was raised above this value, whereas the intense $^2F_{5/2}-^4F_{3/2}$ feature originating from the same initial state grew rapidly at this point. This can only happen through the development of optical gain. Stimulated emission readily accounts for the quenching of several radiative decay channels from the same initial state by the one transition which experiences population inversion first. The same type of spectral redistribution was observed for lines originating from the $^2P_{1/2}$ state, which has a large energy gap to lower states, tending to promote inversion. In this case, the intensity of the $^2P_{1/2}-^4I_{11/2}$ transition suddenly grew when the $^2P_{1/2}-^4I_{9/2}$ transition was quenched, again above a current of 20 $\mu A$.

In FIG. 4, the peak intensity of emission at 469 nm is plotted versus electron current for a more complete data set than depicted in FIG. 1(b). An abrupt change in slope occurs at 10 $\mu A$, indicating the presence of a threshold in the stimulated emission at this wavelength. As indicated by the data in FIG. 2(d), very similar behavior occurs at 870 nm. Because the spectral features are composite lines, consisting of many multiplet-multiplet transitions, no direct measurements of gain narrowing on single lines were possible to supplement the course-grain intensity redistribution observations in the spectra of FIG. 1(b). The dependence of emission intensity in the broad feature at 370 nm was monotonic and showed no indication of a threshold.

In summary, stimulated emission and laser action readily occur in oxide nanocrystals doped with rare earth ions when appropriate electron excitation is provided and absorptive losses are negligible. These materials are capable of continuous-wave ultraviolet laser action, blue light laser action and infrared laser action in the strong scattering regime on the 5d–4f inter-configurational transition of $Ce^{3+}$ at room temperature and inter-configurational transitions of $Nd^{3+}$ as described above. Under some conditions (by changing matrix, doping ion or by addition of combinations of ions or by combinations of ions and matrices) to produce other single wavelength and multiple wavelength stimulated emission.

Coherent back-scattering results at 488 nm confirms that light propagation is lossless and the transport mean free path was very much less than a wavelength. On this basis, doped dielectric nanophosphors offer potential for an entire family of novel, bright sources emitting light uniformly over wide fields of view at ultraviolet, visible and infrared wavelengths. Some important possible applications include nanolithography, sensors for atmospheric pollutants and toxic gases, sources for airborne and space communication devices, and novel materials for displays. By the term "thermodynamic concentration" is meant the thermodynamically stable concentration limit.

What is claimed is:

1. A process for the preparation of optically active mixed metal oxide powder having a mean particle size of less than 500 nm, said process comprising pyrolyzing a mixture of at least one matrix metal oxide precursor compound and at least one transition metal or rare earth metal dopant compound at a temperature in the range of 500° C. to 2500° C. in the vapor phase and condensing to form a powder of mixed metal oxides which exhibits stimulated emission of radiation, pulsed laser action, or continuous laser action.

2. The process of claim 1, wherein the particles of the mixed metal oxide powder have a mean particle size less than 150 nm.

3. The process of claim 1 wherein the matrix metal oxide comprises one or more oxides selected from the group consisting aluminum oxide, yttrium oxide, silicon oxide, zinc oxide, tin oxide, indium oxide, alkali metal silicates, alkaline earth metal silicates, boron oxide, titanium dioxide, ytterbium oxide, and lead oxide.

4. The process of claim 1 wherein the matrix metal oxide further comprises at least two oxides of main group metals.

5. The process of claim 1 further comprising supplying the dopant metal compound in a concentration greater than the thermodynamic solubility of the dopant metal in the powder, and condensing to particles of powder having a dopant metal concentration greater than the thermodynamic solubility in the powder particles.

6. The process of claim 1 wherein said step of pyrolyzing comprises flame spray pyrolyzing a metal oxide precursor dissolved in a flammable organic solvent.

7. A powder produced by the process of claim 1 which exhibits stimulated emission of radiation in the strong scattering regime.

8. A solid state laser device comprising at least one optically active mixed metal oxide powder having a mean particle size less than 500 nm, said mixed metal oxide powders comprising a matrix metal oxide, and a dopant metal oxide selected from transition metal oxides and rare earth metal oxides, optical feedback to sustain laser action provided by strong localization of light in the strong scattering regime.

9. The laser device of claim 8 wherein at least one said matrix metal oxide is selected from the group consisting of aluminum oxide, yttrium oxide, silicon oxide, zinc oxide, tin oxide, indium oxide, alkali metal silicates, alkaline earth metal silicates, boron oxide, titanium dioxide, ytterbium oxide, and lead oxide.

10. A laser device of claim 8 in the form of a thin film.

11. A laser device of any of claim 8 wherein the emitting material is not quantum confined.

12. A laser device of claim 8 which has no optical cavity.

13. A laser device of claim 8 wherein the light emitted is of a different wavelength than the stimulating light.

14. A laser device of claim 8 wherein the stimulating light is ultraviolet light, infrared light, or visible light, and the emitted light is white light.

15. A laser device of claim 8 wherein the stimulating light is infrared light, and the emitted light is visible light or ultraviolet light.

16. A laser device of claim 8 where stimulation of the optically active mixed metal oxide powder is by an electron beam.

17. A laser device of claim 8 wherein said device comprises at least two different optically active mixed metal oxide powders which generate light of different wavelengths.

18. A laser device of claim 8 wherein said matrix oxide is one or more of aluminum oxide, silicon oxide, zinc oxide, tin oxide, indium oxide, boron oxide, lead oxide, or titanium oxide, or is an alkali metal silicate or alkaline earth metal silicate.

19. A laser device of claim 8 wherein said mean particle size is less than 150 nm.

20. A laser device of claim 8 wherein the mean particle size of the mixed metal oxide particles and their assembly is such that the mean scattering length and transport mean free path are less than the wavelength of light emitted.

21. A laser device of claim 8 wherein the light output of said device is incoherent.

* * * * *